Figure 1:
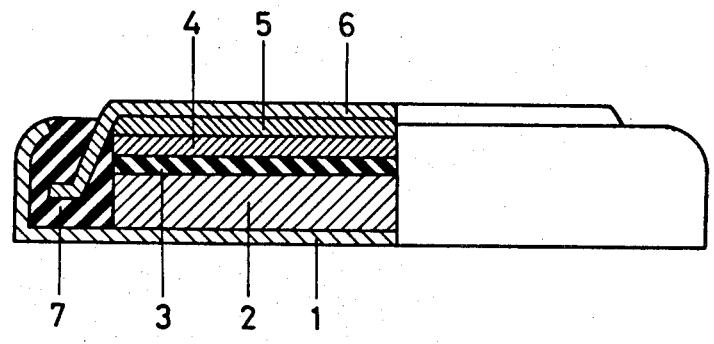

United States Patent [19]

Ikeda et al.

[11] 4,399,202
[45] Aug. 16, 1983

[54] LITHIUM BATTERY

[75] Inventors: Hironosuke Ikeda, Hirakata; Satoshi Narukawa; Shigehiro Nakaido, both of Kobe, all of Japan

[73] Assignee: Sanyo Electric Co., Ltd., Japan

[21] Appl. No.: 271,236

[22] Filed: Jun. 8, 1981

Related U.S. Application Data

[63] Continuation of Ser. No. 129,717, Mar. 12, 1980, abandoned.

[30] Foreign Application Priority Data

Mar. 19, 1979 [JP] Japan .................................. 54-30095

[51] Int. Cl.$^3$ .......................................... H01M 10/48
[52] U.S. Cl. ..................................... 429/91; 429/194; 429/197
[58] Field of Search ................... 429/91, 60, 194, 197, 429/218, 224

[56] References Cited

U.S. PATENT DOCUMENTS

| | | | |
|---|---|---|---|
| 3,558,356 | 1/1971 | Jost | 429/60 |
| 4,025,700 | 5/1977 | Fagan, Jr. et al. | 429/218 X |
| 4,091,178 | 5/1978 | Kordesch | 429/60 |
| 4,166,888 | 9/1979 | Rao et al. | 429/19 X |
| 4,197,366 | 4/1980 | Tamura et al. | 429/197 |

Primary Examiner—Charles F. LeFevour
Attorney, Agent, or Firm—Darby & Darby

[57] ABSTRACT

In a lithium battery having a negative electrode formed with lithium as active material and the positive electrode formed with manganese dioxide, carbon fluoride or the like as the active material, the discharge capacity of the negative electrode is made smaller than the discharge capacity of the positive electrode, whereby a drop in the battery voltage during the final discharge stage is steepened, and prevents a device using such a lithium battery as a power supply from operating in an unstable manner, thereby improving the reliability of such device.

5 Claims, 2 Drawing Figures

LITHIUM BATTERY

This is a continuation of application Ser. No. 129,717, filed Mar. 12, 1980 now abandoned.

FIELD OF THE INVENTION

The present invention relates to improvements in a lithium battery having a negative electrode formed by lithium as an active material and a positive electrode formed by manganese dioxide, carbon fluoride or the like as an active material, and is characterized in that a drop in the battery voltage at the final discharge stage is steepened.

BACKGROUND OF THE INVENTION

A lithium battery employs, as a negative electrode active material, lithium having a large electronegativity, and it therefore has a characteristic feature such that it can provide a high voltage of about 3 V when a positive electrode formed by, for example manganese dioxide, carbon fluoride or the like as an active material, is combined with such a negative electrode to form a battery. Accordingly, only one lithium battery is sufficient for a clock using a liquid crystal display in which ordinarily two silver batteries (each supplying 1.5 V) are connected in series to each other. This presents an advantage to simplify the construction of such clock.

In a lithium battery having a negative electrode formed with lithium as the active material and a positive electrode formed with, for example, manganese dioxide as the active material, the discharge reaction is deemed as shown in the following:

$$Mn^{IV}O_2 + Li \rightarrow Mn^{III}O_2(Li^+)$$

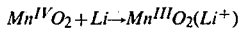

That is, during the discharge of a lithium battery, lithium of the negative electrode is transferred to the positive electrode and a discharge product is increasingly accumulated at the positive electrode, thereby increasing the internal resistance of the battery.

In order to enhance the coefficient of utilization of the positive electrode, a conventional lithium battery is formed such that the discharge capacity of the negative electrode is larger than that of the positive electrode. Thus, such a conventional lithium battery has been constructed as a positive-dominated battery in which the battery discharge expires upon the consumption of the positive electrode. Therefore, such a conventional lithium battery has had a characteristic such that the drop in voltage during the final discharge stage has been slow.

Accordingly, when such conventional lithium batteries have been used as power supplies for a device using a liquid crystal display, a LSI or the like, such slow voltage drop at the final discharge stage has presented inconveniences.

A liquid crystal display is generally operable at a voltage of about 2.4 V or more and is not operable at a voltage of about 1.8 V or less. Between 1.8 V and 2.4 V, it operates in an unstable manner, thereby possibly provoking an erroneous operation the device with which it is used.

Accordingly, it would not be desirable for a battery to have such a characteristic that a drop in voltage at the final discharge stage is gradual.

DISCLOSURE OF THE INVENTION

The present invention relates to improvements in a conventional lithium battery, and more particularly to improvements in its characteristic during the final discharge stage such that the drop in the battery voltage is gradual.

In a lithium battery, the electronegativity of the lithium negative electrode is much larger, in terms of the electrode potential, than the electropositivity of the positive electrode. By utilizing such a fact, a lithium battery according to the present invention is formed such that the discharge capacity of the negative electrode is smaller than that of the positive electrode, so that a drop in voltage during the final discharge stage is steepened. Namely, the discharge capacity of the lithium negative electrode, having an electronegativity much larger than the electropositivity of the positive electrode, is made smaller than the discharge capacity of the positive electrode. Thus, a battery of the present invention is constructed as a negative-dominated battery in which the discharge expires upon the consumption of the negative electrode, and a drop in voltage is steepened when the lithium negative electrode having a large electrode potential is consumed.

BRIEF DESCRIPTION OF THE INVENTION

Figure 2:
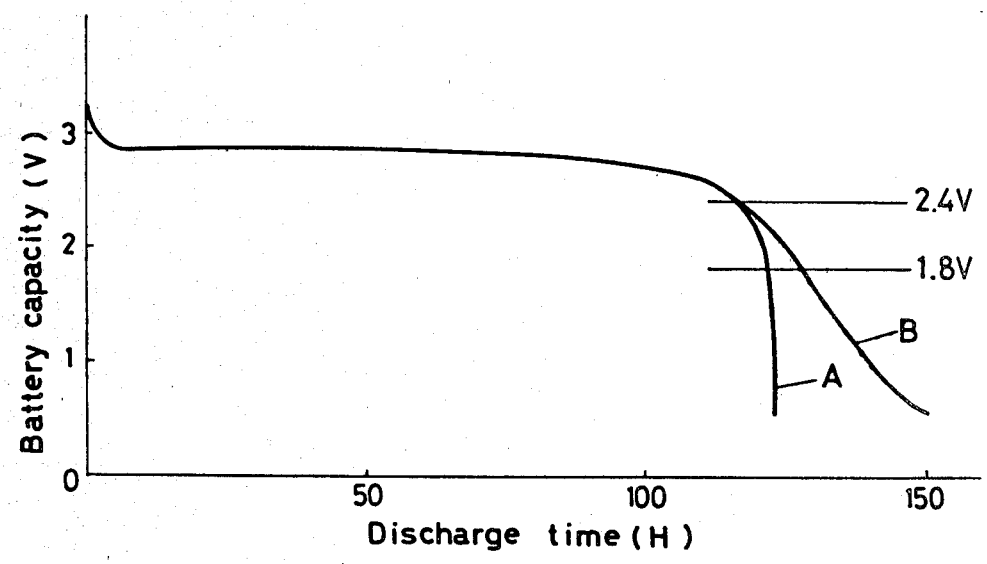

The invention will further be described by way of example, with reference to the accompanying drawings in which:

FIG. 1 is a partial sectional view of an embodiment of a lithium battery in accordance with the present invention; and FIG. 2 is a diagram showing the discharge characteristics of the lithium battery of the present invention and a conventional lithium battery.

PREFERRED EMBODIMENTS OF THE INVENTION

The description will first be made of the construction of a lithium battery, according to the present invention, having a negative electrode formed with lithium as the active material and a positive electrode formed with manganese dioxide as the active material, and with reference to FIG. 1.

A positive electrode 2 of manganese dioxide is placed on the bottom of a battery vessel 1.

A lithium rolled plate 4 is placed on the top of the positive electrode 2 with a separator layer 3 made of a polypropylene non-woven fabric or other suitable material there between. A lid 6 is placed on the top of the negative electrode 4 with a negative collector member 5 there between. The lid 6 and the periphery of the battery vessel 1 are sealingly closed through packing 7.

As an electrolyte, there is used a solution of lithium perchlorate in propylene carbonate.

The description hereinafter will discuss in detail one embodiment of the lithium battery in accordance with the present invention.

As a negative electrode, there is used a lithium rolled plate having an outer diameter of about 15 mm and a thickness of about 0.15 mm. Such a negative electrode has a discharge capacity of about 50 mAH.

As a positive electrode, a depolarizer mix in which a conductive agent and a binder are mixed with active material of manganese dioxide and press-compacted into a plate having an outer diameter of about 15 mm and a thickness of about 0.50 mm. Such a positive electrode has a discharge capacity of about 65 mAH.

As an electrolyte, there is used a solution of lithium perchlorate in a solvent of propylene carbonate mixed with 1.2 dimethoxyethane at an equivalent ratio by volume. As a separator layer, a polypropylene non-woven fabric is used. Thus, a flat lithium battery having a capacity of 50 mAH is prepared.

The discharge characteristic of the thus prepared battery a 5.6K Ω constant load was investigated and obtained as shown by curve A in FIG. 2.

As is apparent from FIG. 2, since the lithium battery of the present invention is constructed as a negative-dominated battery in which the discharge capacity of the negative electrode is smaller than that of the positive electrode, the battery has such a characteristic that a drop in voltage is steepened from about 2.4 V at the final dischage state. Such a characteristic is due to the fact that the lithium active material in the negative electrode is transferred to the positive electrode in the discharge reaction of a lithium battery and that the battery voltage is suddenly dropped at the time when the lithium negative electrode is consumed, since the electronegativity of the lithium negative electrode is much larger, in terms of the electrode potential, than the electropositivity of the positive electrode.

According to the lithium battery of the present invention, the discharge capacity of the negative electrode formed with lithium as the active material is smaller than that of the positive electrode, thereby enabling the drop in the battery voltage during the final discharge stage to be steepened.

For the purpose of comparison of the lithium battery of the present invention with a conventional lithium battery, curve B in FIG. 2 shows the discharge characteristic with 5.6K Ω constant load of a conventional positive-dominated lithium battery having a negative electrode discharge capacity of about 70 mAH and a positive electrode discharge capacity of about 65 mAH. As apparent from FIG. 2, the voltage of such a conventional positive-dominated lithium battery is dropped slowly during the final discharge stage.

According to the lithium battery of the present invention, a drop in the battery voltage during the final discharge stage is steepened. Accordingly, when such a lithium battery is used as a power supply for a device using a liquid crystal display, a LSI or the like, the period of time during which such liquid crystal display is operated in an unstable manner due to a drop in the battery voltage is reduced. In other words, the period of time during which an erroneous operation of such a device might be provoked, can be shortened by a steep drop in battery voltage, thereby improving the reliability of a device in which a liquid crystal display, a LSI or the like is combined with the lithium battery of the present invention.

What we claim:

1. A battery comprising:
   a positive electrode consisting essentially of manganese dioxide as an active material;
   a negative electrode consisting essentially of lithium as an active material, said negative electrode having a much larger electrode potential and a smaller discharge capacity than said positive electrode; and
   an electrolyte comprising of an organic material which is a solution of a salt of lithium in an organic solvent.

2. The battery of claim 1 further including a separator layer located between the positive and negative electrodes, said separator layer being formed of polypropylene non-woven fabric.

3. The battery of claim 1 wherein the salt of lithium includes lithium perchlorate and the organic solvent includes propylene carbonate.

4. The battery of claim 3, wherein said negative electrode has a discharge capacity of about 50 mAH.

5. The battery of claim 1 wherein the organic solvent is propylene carbonate mixed with 1.2 dimethoxyethane at an equivalent ratio by volume.

* * * * *